Dec. 7, 1926.
G. E. HULSE
1,609,358
REGULATING APPARATUS
Filed Jan. 19, 1925  2 Sheets-Sheet 1
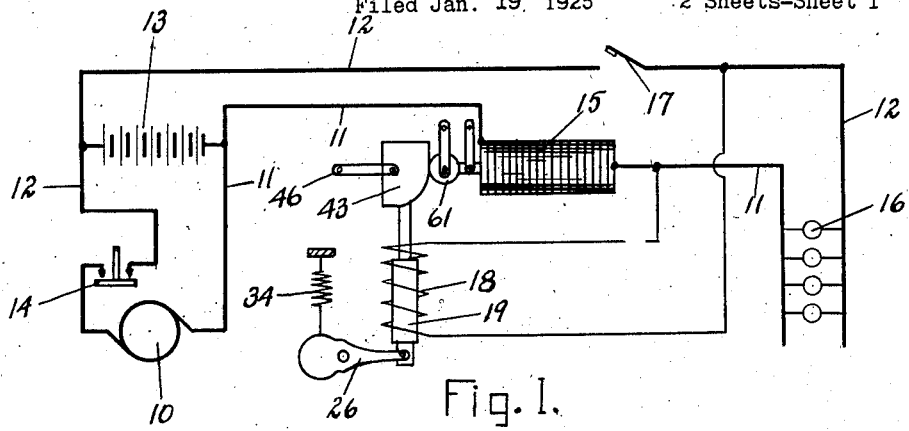
Fig. I.
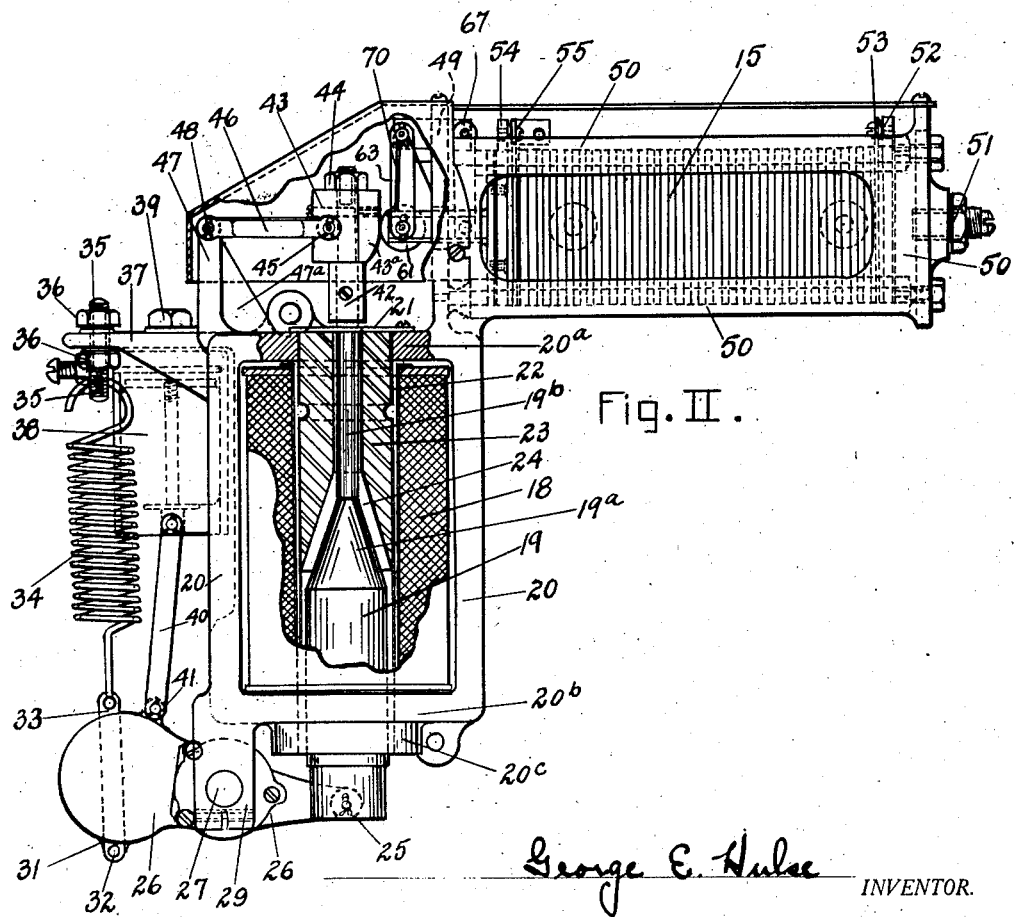
Fig. II.
George E. Hulse INVENTOR.
BY
Robert L. Blair ATTORNEY.

Dec. 7, 1926.
G. E. HULSE
1,609,358
REGULATING APPARATUS
Filed Jan. 19, 1925   2 Sheets-Sheet 2
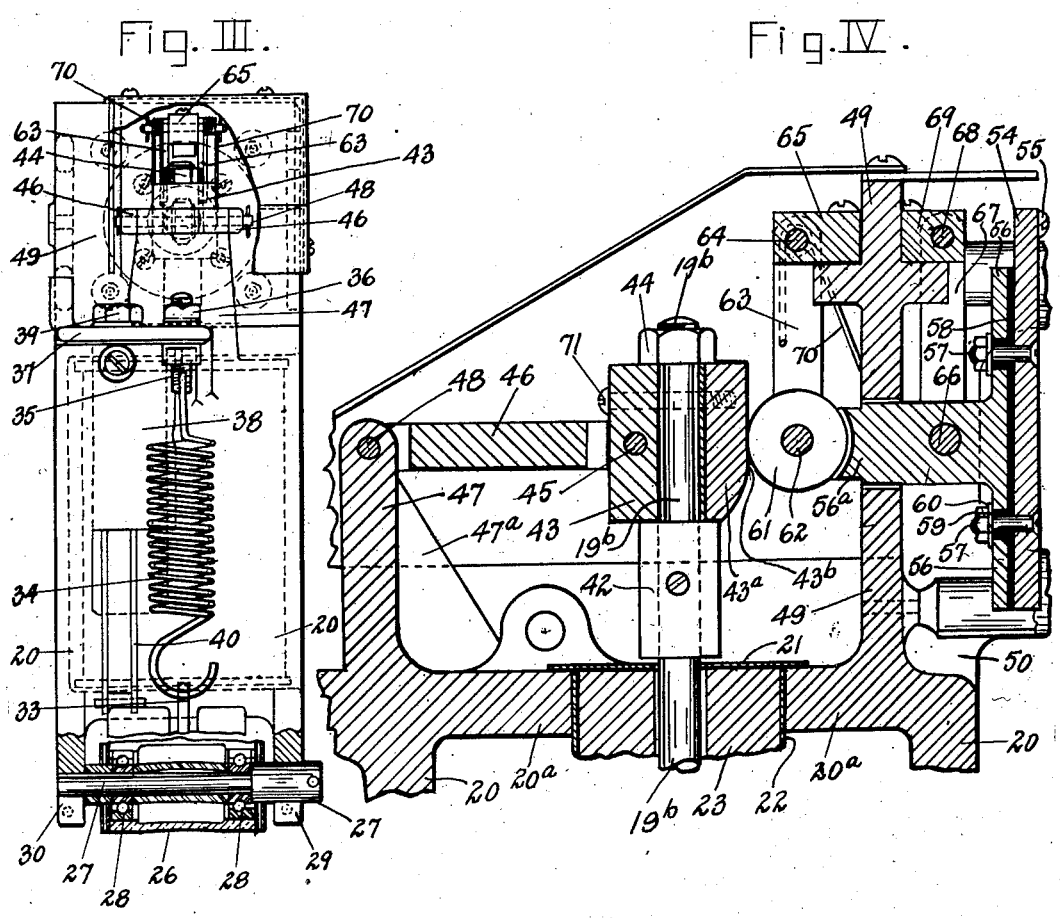
George E. Hulse INVENTOR.
BY
Robert S. Blair ATTORNEY.

Patented Dec. 7, 1926.

1,609,358

UNITED STATES PATENT OFFICE.

GEORGE E. HULSE, OF NEW HAVEN, CONNECTICUT, ASSIGNOR TO THE SAFETY CAR HEATING & LIGHTING COMPANY, A CORPORATION OF NEW JERSEY.

REGULATING APPARATUS.

Application filed January 19, 1925. Serial No. 3,536.

This invention relates to electrical regulating apparatus. One of the objects thereof is to provide such apparatus accurate and dependable in operation and efficient to a high degree. Another object is to provide apparatus of the above nature which, employed in a circuit containing a storage battery, is adapted to make most efficient utilization of the charge of the storage battery. Another object is to provide regulating apparatus of the above nature simple and compact in construction, characterized by freedom from complicated mechanisms and from complicated adjustments. Another object is to provide such apparatus which is strong and rugged, capable of long dependable service. Other objects will be in part obvious or in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawings, in which is shown one of the various possible embodiments of this invention, Figure 1 is a diagrammatic plan of the apparatus and electric circuits;

Figure 2 is a side elevation of the apparatus partly cut away to disclose the inner structure;

Figure 3 is an end view, viewed from the left of Figure 2 and also partly cut away, and Figure 4 is a vertical section taken substantially along the line 4—4 of Fig. 3 through a portion of the apparatus.

Similar reference characters refer to similar parts throughout the several views of the drawings.

Referring now to Figure 1 of the drawings in detail, there is shown a generator 10 which is variably driven for example from the axle of the railroad car. Bridged across the mains 11 and 12 from the generator 10 is a storage or secondary battery 13 adapted to be charged by the generator. Between the generator 10 and the battery 13 is interposed a suitable automatic switch 14 of a type well known in the art. Serially connected in the main 11 is a variable resistance medium 15 which in this instance takes the form of a compressible carbon pile, and bridged across the mains at a point beyond this resistance are lamps or other translating devices 16. A suitable hand switch 17 is provided for making and breaking the lamp circuit. Also bridged across the mains 11 and 12 at a point adjacent the lamps 16 is a voltage coil 18.

It may be noted at this point that the magnetic field of the coil 18 will vary with variations in the voltage across the lamps 16. The coil 18 is provided with a core or plunger 19, which is movable in response to variations in the magnetic field of the coil. Such movements of the plunger are utilized to appropriately vary the resistance of the resistance medium 15, through instrumentalities which will presently be described, to maintain the voltage across the lamps 16 substantially constant, irrespective of fluctuations in the voltage across the terminals of the battery 13.

Referring now to Figure 2, the voltage coil 18 is shown to be mounted in upright position within a rugged frame work 20. The core or plunger 19 is supported in vertical position in an opening passing through the center of the coil. The plunger is formed with a lower enlarged portion tapering off at the portion 19ª into a part 19ᵇ which extends upwardly above the top of the coil, passing through an opening in the top member 20ª of the frame 20. The opening through the part 20ª is of substantially greater diameter than the diameter of the part 19ᵇ of the plunger, having a diameter substantially equal to the inner diameter of the coil 18 and concentric therewith. Over this opening in the part 20ª is secured a disk 21 from which depends a cylindrical casing 22 which is filled with a magnetic material 23. Through the material 23 and the disk 21 is formed a central passage through which the part 19ᵇ of the plunger loosely extends. The member formed of the magnetic material 23 terminates at a point a little below the center of the coil 18 and the plunger passage therethrough is enlarged, as shown at 24, in a gradual taper corresponding to the taper of the part 19ª of the plunger.

The shape of the plunger 19 and of the magnetic member 23, with their corresponding tapered surfaces, is such that certain desired characteristics in the action of the magnetic field of the coil upon the plunger are attained. With the construction just described, the magnetic pull of the coil 18 upon the plunger 19 is for a given predetermined voltage across the coil a substantially constant quantity in any position assumed by the plunger 19 within the coil. Thus, if the plunger 19 is at a certain position along its path of movement within the coil at a certain normal or desired voltage, the plunger will move in one direction or the other as soon as this voltage changes. When the voltage across the coil is now restored to the desired normal voltage, the plunger will be held in the position to which it was moved by the first change in voltage, instead of moving back to its original position.

The lower end of the plunger 19 projects through an opening in the bottom $20^b$ of the frame 20, through a circular flange $20^c$ thereon, and through its projecting end portion passes a pin 25. The pin 25 passes through the right-hand end of a lever 26. This lever 26 is pivoted adjacent its center upon a bearing pin 27, preferably through ball bearings 28 (Fig. 3), the pin 27 being supported in a pair of lugs 29 and 30 depending from the frame 20.

On the left-hand end of the lever 26 is a lug 31 to which is pivoted by means of a pin 32 the lower end of a link 33, the upper end of which is connected with the lower end of a tension spring 34. The upper end of the spring 34 is secured in an adjusting bolt 35 provided with adjusting nuts 36 and passing through a ledge 37 projecting from the side of the frame 20.

The magnetic field of the coil 18 exerts an upward pull upon the core or plunger 19 and the tension spring 34 acting through the lever 26 acts in opposition to the pull of the coil. The proper relation between the coil 26 and the spring 34 may be accurately attained by proper construction of the coil, and of the spring 34, and further by adjustment of the tension in the spring at the adjusting bolt 35. A dash pot 38 is secured upon the ledge 37 by suitable securing means 39, and the piston thereof is connected through a link 40 with the lever 26 at 41. This dash pot exerts a restraining force upon the movements of the plunger 19 in either direction and serves to steady its movement and prevent "hunting" of the regulator.

Secured upon the portion $19^b$ of the plunger above the plate 21 is a collar 42, the lower surface of which engaging the plate 21 limits the downward movement of the plunger. Upon the part $19^b$ above the collar 42 is secured a cam 43 held against the upper surface of the collar 42 by a nut 44. This cam will later be described in detail. Passing through the cam to the left of the opening therein through which the part $19^b$ of the plunger passes, is a pin 45 which also passes through the forked right-hand end of a link 46. The left-hand end of the link 46 is also similarly forked, embracing a part 47 projecting upwardly from the frame 20, and connected with the part 47 by means of a pin 48. The part 47 is suitably braced against lateral thrust by means of webs $47^a$. The part 47, as shown in Figure 3, is of substantial width and the link 46 is of a corresponding width, these parts being sturdily built to withstand a high lateral pressure.

The plunger 19 is thus guided, in its movement, at one end by the lever 26 and at the other end by the link 46. The path of movement of the plunger through the coil is thus dependably maintained in a substantially straight line. The thrust upon the cam 43, which at times may be very high, as will be pointed out, is transmitted directly through the link 46 to the part 47, thereby relieving the plunger 19 of undue stresses.

Projecting upwardly from the frame 20 adjacent its right-hand side is a plate 49, which is more clearly shown in Figure 4. Projecting at substantially right angles to this plate 49 is a frame work 50 in which is carried the carbon pile 15, which as is well known, comprises a plurality of carbon disks positioned face to face. The left-hand end of the carbon pile is the movable end and the right-hand end thereof is fixed, being suitably insulated from the frame and adjustable toward or away from the left-hand end by means of a suitable threaded adjustment 51. The lead passing to the lamps 16 is connected to the fixed right-hand terminal plate 52 of the carbon pile at 53. The left-hand terminal plate 54 of the pile is movable to compress or relieve pressure upon the carbon disks, and the lead passing to the battery is connected therewith at 55.

As best shown in Figure 4, there is secured to the movable terminal plate 54 a plate 56 which may be termed a pressure plate, and which has a central projection $56^a$ extending through an opening in the plate 49 of the frame, toward the cam 43. The pressure plate 56 and the terminal plate 54 are secured together as by bolts 57 and properly insulated by insulation 58, insulating bushings 59 and insulating washers 60. Lateral movement of the pressure plate 56, therefore, varies the pressure upon the carbon pile 15, varying the resistance thereof and hence the resistance or I. R. drop in the lamp circuit.

Upon the left-hand end of the projecting part $56^a$ of the pressure plate 56 is supported a hardened roller 61 by means of a pin 62. This roller coacts with the surface of the cam 43. The pin 62 in addition to passing through the part 56 and the roller 61, passes through the lower ends of a pair of links 63. These links are supported at their upper ends upon a pin 64 passing through a lug 65, which lug is secured and supported against the left-hand face of the frame plate 49. A pin 66, similar to the pin 62, passes through the part 56ª adjacent its connection with the pressure plate 56, and also passes through the lower ends of a pair of links 67 similar to the links 63. These links 67 are suspended at their upper ends upon a pin 68 passing through a lug 69 which is secured and supported against the right-hand face of the frame plate 49. The part 56ª with the pressure plate 56 and the roller 61 carried thereby are thus suspended by a double pair of parallel links for lateral movement toward and away from the cam 43 to compress the carbon pile 15 or relieve pressure thereon. The suspension of the pressure plate is such that it is permitted substantially frictionless movement, and forces other than the desired lateral thrust exerted by the cam 43 upon the roller 61 are effectively absorbed by the links 63 and 67 without undue friction or resistance to the movement of the pressure plate.

The cam 43 is provided with a hardened portion 43ª, the right-hand surface of which contacts with the surface of the roller 61. A pair of springs 70 carried upon the pin 64 bear at their inner ends against the surface of the frame plate 49 and at their outer ends are anchored in the links 63 adjacent the roller 61 and thus urge the pressure plate to the left, maintaining the roller 61 always in contact with the surface of the part 43ª of the cam. This portion 43ª of the cam may be removably held in place thereon as by screws 71, so as to be removable therefrom and interchangeable with other parts having differently shaped surfaces, if desired.

The surface of the part 43ª of the cam 43 engaging the roller 61 is shaped so that its movements in response to variations in voltage across the coil 18 will move the pressure plate 56 to vary the resistance of the carbon pile 51 so as to maintain the voltage across the coil 18, and hence across the lamps 16, at a substantially constant value. Considering now the action of this apparatus, assume, for example, that the predetermined voltage desired to be maintained across the lamps 16 is twenty-eight volts, and that such voltage exists across the lamps and hence across the coil 18. Now if the voltage across the terminals of the battery 13 increases a slight amount, the voltage across the coil 18 will correspondingly increase. Such increase in the voltage of the coil 18 results in a drawing upward of the plunger 19 against the action of the spring 34, the roller 61 moving down the inclined surface of the cam 43, permitting the pressure plate 56 to move to the left under the urge of the spring 70 to relieve pressure upon the carbon pile 15 and increase the resistance thereof. Such increase in the resistance of the lamp circuit causes the voltage across the coil 18 to drop back again and, as soon as the voltage is restored to the assumed normal voltage of twenty-eight volts, the movement of the plunger 19 is arrested and, as has been described above, the plunger is held in this new position at which the resistance of the pile 15 is such that with the new and higher voltage at the terminals of the battery, the voltage across the lamps is twenty-eight volts. When the voltage across the terminals of the battery 13 drops a slight amount, the voltage across the coil 18 and across the lamps correspondingly drops. Such drop in the voltage across the coil 18 permits the plunger 19 to move downwardly under the urge of the spring 34, and the roller 61 riding up the inclined surface of the cam 43 increases the pressure upon the carbon pile, decreasing the resistance thereof. Such decrease in the resistance of the carbon pile restores the voltage across the coil 18, and when the voltage of the coil has been returned to the normal predetermined voltage desired, the plunger 19 and the cam 43 are held in the position to which they were moved to bring about this change in voltage. Thus, as the voltage across the terminals of the battery 13 varies, the voltage across the lamps 16 is maintained at a substantially constant value.

The surface of the cam 43 acthing upon the roller 61 may be shaped as required to accurately bring about the desired changes in the resistance of the carbon pile in accordance with the characteristics of the battery 13. It is well known that during discharge of a storage battery the voltage thereof drops off only gradually until a point near the end of the discharge is approached, whereupon the voltage drops off much more rapidly and continues such rapid drop until the battery is fully discharged. It may thus be said that there are two distinct ranges in the discharge of the battery, the first being that during which the voltage drops off gradually and the second being that during which the voltage drops off with greater rapidity. The regulating apparatus of this invention is particularly adapted for efficient utilization of the battery voltage during this second range of its discharge. The lamp voltage may accurately be regulated during this second range of discharge of the battery, the constant voltage of the lamps being maintained substantially until the battery voltage drops below the desired constant voltage.

The surface of the cam 43 is provided with two distinct portions for coacting with the roller 61 during the two distinct ranges of discharge of the battery. The active surface of the cam from the lower edge thereof to substantially a point 43$^b$ is properly curved to take care of the adjustment of the pressure against the carbon pile during the first range of discharge of the battery when the voltage thereof is decreasing gradually. The portion of the cam surface above the point 43$^b$ is adapted to take care of the pressure upon the carbon pile during the second range of discharge of the battery, when its voltage is dropping off more rapidly. When a high voltage exists across the terminals of the battery 13, as when the battery is fully charged, the lower end of the cam surface, it will be understood, is in engagement with the roller 61. As the battery voltage gradually drops off, the cam 43 moves downwardly, the roller 61 riding up the incline thereof and gradually increasing the pressure upon the carbon pile to reduce the resistance of the lamp circuit and maintain the voltage across the lamps substantially constant. When the roller has reached the point 43$^b$ the first range of discharge of the storage battery is substantially over, and the battery voltage starts to drop off more rapidly. At this point the battery voltage is approaching the constant lamp voltage and the carbon pile is under high compression. Now as the voltage of the battery drops further, and the cam 43 continues to move downwardly the surface of the cam above the point 43$^b$ comes into play against the roller 61.

This last surface of the cam is tapered or inclined only very slightly. The carbon pile being already under high compression, a very small movement downwardly of the cam, through the slightly inclined surface thereof, exerts an enormous pressure upon the roller 61 and against the carbon pile. As the voltage across the terminals of the battery rapidly falls off, therefore, the pressure exerted by the cam upon the carbon pile under the urge of the spring 34 drawing downwardly on the plunger 19, builds up rapidly, and as the battery voltage approaches the constant lamp voltage the resistance of the carbon pile may be reduced to a substantially negligible value. Thus, the regulation of the voltage of the lamps is effectively maintained throughout substantially the longest available range of discharge of the storage battery, and the charge of the storage battery is most efficiently used.

The active surface of the cam 43 may be accurately shaped to provide for an extreme fineness of control of the carbon pile as the voltage across the storage battery varies, to provide for accurate regulation of the lamp voltage. The movements of the plunger 19 are transmitted directly to the carbon pile so that there is no lost motion. The apparatus is composed of a small number of moving parts, the parts employed being disposed for the most efficient cooperation in the production of the desired result of an accurate voltage regulation. Moreover, the parts are so related that the high pressures resulting from the operation of the apparatus are effectively taken care of without cramping the freedom of movement of the movable parts, and without creating undue stresses. The apparatus is sturdily built throughout for dependable service, and is constructed for a highly compact disposition of the various parts.

From the above, it will be seen that there is herein provided an apparatus which embodies the features of this invention and attains the objects thereof, and that the same is well adapted to meet the requirements of practical use in a most efficient manner.

As many possible embodiments may be made of the above invention, and as many changes might be made in the embodiment above set forth, it is to be understood that all matter hereinbefore set forth is to be interpreted as illustrative and not in a limiting sense.

I claim as my invention:

1. In regulating apparatus, in combination, a pressure controlled variable resistance device, a voltage coil, a plunger entering said coil and adapted to move in response to variations in the pull of said coil thereon, a cam mounted directly upon said plunger, and means acted upon by said cam adapted to vary the pressure upon said resistance device in response to movements of said plunger and at a rate governed by the shape of said cam.

2. In regulating apparatus, in combination, a pressure controlled variable resistance device, a voltage coil, a plunger for said coil adapted to move in response to variations in the pull of said coil thereon, a member movable in a direction substantially at right angles to the direction of movement of said plunger and adapted upon movement to vary the pressure upon said resistance device, and a cam mounted directly upon said plunger and engaging said member adapted upon movement of said plunger to move said member at a rate governed by the shape of said cam.

3. In regulating apparatus, in combination, a carbon pile, a voltage coil, a plunger for said coil adapted to move in response to variations in the pull of said coil thereon, a movable pressure plate adapted upon movement to vary the pressure upon said carbon pile, a roller carried by said pressure plate, and a cam mounted directly upon said plunger and coacting with said roller adapted upon movement of said plunger to move said pressure plate at a rate governed by the shape of said cam.

4. In regulating apparatus, in combination, a carbon pile, a voltage coil, a plunger for said coil adapted to move in response to variations in the pull of said coil thereon, a movable pressure plate movable in a direction substantially transversely of the line of movement of said plunger and adapted upon movement to vary the pressure upon said carbon pile, a cam carried by said plunger and adapted upon movement of said plunger to move said pressure plate, and means supporting said plunger positioned to absorb the transverse thrust upon said plunger occasioned by pressure of said cam against said pressure plate.

5. In regulating apparatus, in combination, a carbon pile, a voltage coil, a plunger for said coil adapted to move in response to variations in the pull of said coil thereon, means supporting said plunger for permitting such movement, a movable pressure plate adapted upon movement to vary the pressure upon said carbon pile, a cam carried at one end of said plunger adapted upon movement of said plunger to move said pressure plate at a rate governed by the shape of said cam, and means connected adjacent the opposite end of said plunger opposing the movement thereof in response to the pull of said coil.

6. In regulating apparatus, in combination, a carbon pile, a voltage coil, a plunger for said coil adapted to move in response to variations in the pull of said coil thereon, a member adapted upon movement to vary the pressure upon said carbon pile, parallel links loosely supporting said member, and a cam coacting with said member movable in response to movements of said plunger and adapted upon movement to move said member at a rate governed by the shape of said cam.

7. In regulating apparatus, in combination, a resistance device the resistance of which varies with the pressure thereon, a coil, a plunger passing through said coil and projecting from either end thereof, means supporting said plunger for movement longitudinally within said coil in response to variations in the pull of said coil thereon, said means comprising a support for said plunger at each of said projecting ends thereof, and means providing a cam surface between said plunger and said resistance device adapted to vary the compression upon the latter in response to movements of the former.

8. In regulating apparatus, in combination, a resistance device the resistance of which varies with the pressure thereon, a coil, a plunger passing through said coil and projecting from either end thereof, means supporting said plunger for movement longitudinally within said coil in response to variations in the pull of said coil thereon, said means comprising a pair of parallel links one of which is connected to said plunger at each of said projecting ends thereof, and means providing a cam surface movable in response to movements of said plunger and positioned between the same and said resistance device and adapted to vary the compression upon the latter in response to movements of the former.

9. In regulating apparatus, in combination, a resistance device the resistance of which varies with the pressure thereon, a coil, a plunger passing through said coil and projecting from either end thereof, means supporting said plunger for movement longitudinally within said coil in response to variations in the pull of said coil thereon, said means comprising a support for said plunger at each of said projecting ends thereof, and means cooperating with said plunger adjacent one of said supports adapted to transmit thrust from said plunger to said resistance to vary the compression of said resistance device in response to movements of said plunger, said one support being positioned to absorb the thrust upon said plunger occasioned by said compression.

10. In regulating apparatus, in combination, a resistance device the resistance of which varies with the pressure thereon, a coil, a plunger passing through said coil and projecting from either end thereof, means supporting said plunger for movement longitudinally within said coil in response to variations in the pull of said coil thereon, said means comprising a pivotal support for said plunger at each of said projecting ends thereof, means cooperating with said plunger adjacent one of said pivotal supports adapted to vary the compression of said resistance device in response to movements of said plunger, and spring means acting upon said plunger through said other pivotal support and opposing the movements of said plunger in response to the pull of said coil.

11. In regulating apparatus, in combination, a resistance device the resistance of which varies with the pressure thereon, a coil, a plunger passing through said coil and projecting from either end thereof, means supporting said plunger for movement longitudinally within said coil in response to variations in the pull of said coil thereon, said means comprising a pair of parallel links one of which is connected to said plunger at each of said projecting ends thereof, means cooperating with said plunger adjacent one of said links adapted to vary the compression of said resistance device in response to movements of said plunger, said one link being positioned to absorb the thrust upon said plunger occasioned by said compression, and spring means acting upon said plunger through said other link and opposing the movements of said plunger in response to the pull of said coil.

12. In regulating apparatus, in combination, a resistance device the resistance of which varies with the pressure thereon, a coil, a plunger within said coil projecting from the end thereof and movable longitudinally in response to variations in the pull of said coil thereon, means including a cam surface interposed between said resistance device and said projecting end of said plunger adapted upon movement of said plunger to change the compression of said device at a rate governed by the shape of said cam and means supporting said projecting end of said plunger against the thrust thereon occasioned by said compression.

13. In regulating apparatus, in combination, a resistance device the resistance of which varies with the pressure thereon, a coil, a plunger within said coil projecting from the end thereof and movable longitudinally in response to variations in the pull of said coil thereon, a rigid member adjacent said projecting end of said plunger and movable substantially transversely of the line of movement of said plunger to compress said resistance device, a cam surface between said member and said projecting end of said plunger adapted upon movement of said plunger to move said member at a rate governed by the shape of said cam surface, and means supporting said end of said plunger against the transverse thrust thereon.

14. In regulating apparatus, in combination, a resistance device the resistance of which varies with the pressure thereon, a coil, a plunger within said coil projecting from the end thereof and movable longitudinally in response to variations in the pull of said coil thereon, a rigid member adjacent said projecting end of said plunger and movable substantially transversely of the line of movement of said plunger to compress said resistance device, a cam mounted upon said projecting end of said plunger and coacting with said member, and means acting against said end of said plunger to oppose the transverse thrust thereon occasioned by the coaction of said cam and said member.

15. In regulating apparatus, in combination, a resistance device the resistance of which varies with the pressure thereon, a coil, a member movable in response to variations in the magnetic field of said coil, and means including a cam interposed between said member and said resistance device adapted upon movement of the former to change the compression of the latter at a rate governed by the shape of said cam, said cam having an operative face which is removable and replaceable by operative faces having different shapes.

16. In regulating apparatus, in combination, a resistance device the resistance of which varies with the pressure thereon, a coil, a plunger for said coil, parallel links supporting said plunger for longitudinal movement in response to variations in the magnetic field of said coil, a member adapted to act against said resistance device, parallel links supporting said member for movement to increase and decrease the compression of said resistance device, and means interposed between said plunger and said member adapted to move the latter in response to movements of the former.

17. In regulating apparatus, in combination, a resistance device the resistance of which varies with the pressure thereon, a coil, a plunger for said coil, parallel links supporting said plunger for longitudinal movement in response to variations in the magnetic field of said coil, a member acting against said resistance device, parallel links supporting said member for movement substantially transversely of the line of movement of said plunger to increase and decrease the depression of said resistance device, and means including a cam interposed between said plunger and said member adapted to move the latter in response to movements of the former to change the compression of said resistance device at a rate governed by the shape of said cam.

18. In regulating apparatus, in combination, a resistance device the resistance of which varies with the pressure thereon, a coil, a plunger for said coil, parallel links supporting said plunger for longitudinal movement in response to variations in the magnetic field of said coil, a member acting against said resistance device, parallel links supporting said member for movement substantially transversely of the line of movement of said plunger to increase and decrease the depression of said resistance device, and a cam mounted upon said plunger and coacting with said member adapted upon movement of said plunger to move said member and change the compression of said resistance device at a rate governed by the shape of said cam.

19. In regulating apparatus, in combination, a frame comprising two parts one extending substantially at right angles to the other, a carbon pile mounted in one of said frame parts, a coil mounted in the other of said frame parts, a plunger for said coil movable longitudinally therein in response to variations in the magnetic field thereof, and means coacting with said plunger adapted upon movement thereof to transmit a thrust substantially at right angles to the line of movement of said plunger and to compress said carbon pile.

20. In regulating apparatus, in combination, a frame comprising two parts one extending substantially at right angles to the other, a carbon pile mounted in one of said frame parts, a coil mounted in the other of said frame parts, a plunger for said coil movable longitudinally therein in response to variations in the magnetic field thereof, means coacting with said plunger adapted upon movement thereof to transmit a thrust substantially at right angles to the line of movement of said plunger and to compress said carbon pile, and means connected to said frame bracing said plunger against the transverse thrust thereon.

21. In regulating apparatus, in combination, a frame comprising two parts one extending substantially at right angles to the other, a carbon pile mounted in one of said frame parts, a coil mounted in the other of said frame parts, a plunger for said coil movable longitudinally therein in response to variations in the magnetic field thereof, a pressure plate acting upon said carbon pile and supported for movement substantially transversely of the line of movement of said plunger, and a cam interposed between said plunger and said pressure plate adapted upon movement of the former to move the latter and change the compression of said carbon pile at a rate governed by the shape of said cam.

22. In regulating apparatus, in combination, a frame comprising two parts one extending substantially at right angles to the other, a carbon pile mounted in one of said frame parts, a coil mounted in the other of said frame parts, a plunger for said coil movable longitudinally therein in response to variations in the magnetic field thereof, a pressure plate acting upon said carbon pile and supported for movement substantially transversely of the line of movement of said plunger, a cam mounted upon said plunger and coacting with said pressure plate, and a support for said plunger against said frame substantially in line with the thrust exerted by said cam.

In testimony whereof, I have signed my name to this specification this sixth day of January, 1925.

GEORGE E. HULSE.